US009990514B2

(12) United States Patent
Cohen et al.

(10) Patent No.: US 9,990,514 B2
(45) Date of Patent: *Jun. 5, 2018

(54) JOINT OWNERSHIP OF PROTECTED INFORMATION

(71) Applicant: Microsoft Technology Licensing, LLC, Redmond, WA (US)

(72) Inventors: Yair Cohen, Seattle, WA (US); Nir Winter, Tel Aviv (IL); Nir Shalom Soudry, Tel Aviv (IL)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/446,179

(22) Filed: Mar. 1, 2017

(65) Prior Publication Data
US 2017/0177900 A1 Jun. 22, 2017

Related U.S. Application Data

(63) Continuation of application No. 14/316,777, filed on Jun. 26, 2014, now Pat. No. 9,609,032.

(51) Int. Cl.
G06F 21/62 (2013.01)
H04L 29/06 (2006.01)
(Continued)

(52) U.S. Cl.
CPC .......... G06F 21/6227 (2013.01); G06F 17/24 (2013.01); G06F 17/30011 (2013.01); H04L 65/403 (2013.01); G06F 2221/2147 (2013.01)

(58) Field of Classification Search
CPC ......... G06F 21/6209; G06F 2221/2147; G06F 21/6218; G06F 17/24; G06F 17/30011; H04L 65/403
See application file for complete search history.

(56) References Cited

U.S. PATENT DOCUMENTS 7,467,415 B2   12/2008   Carter
8,176,334 B2   5/2012    Vainstein
(Continued)

FOREIGN PATENT DOCUMENTS

WO   2007036862 A2   4/2007

OTHER PUBLICATIONS

"WatchDox Updates Secure Data Sharing Platform, Launches Sync," FierceContentManagement website, Retrieved Online at http://www.fiercecontentmanagement.com/press-releases/watchdox-updates-secure-data-sharing-platform-launches-sync, Jul. 5, 2012, 3 pages.
(Continued)

Primary Examiner — Anil K Bhargava
(74) Attorney, Agent, or Firm — Alleman Hall Creasman & Tuttle LLP

(57) ABSTRACT

Disclosed herein is a system and method for managing collaborative electronic data that is owned by two different users who belong to different organizations. Both users are also granted ownership rights of collaborative electronic data created by the users. Users then contribute to the collaborative electronic data by providing information that may be confidential to their organization. The users want to ensure that they can cut off access to the confidential information if and when the relationship between the users or organizations sours. When one of the users with ownership privileges decides to end the cooperation with the other users, that user simply revokes access to the collaborative electronic data to the other user. As a result of the revocation all users are no longer able to see or access at least a portion of the collaborative electronic data to protect confidential information of all the parties.

15 Claims, 4 Drawing Sheets

(51) Int. Cl.
*G06F 17/30* (2006.01)
*G06F 17/24* (2006.01)

(56) References Cited

U.S. PATENT DOCUMENTS

| | | | | |
|---|---|---|---|---|
| 9,020,913 | B2* | 4/2015 | Rajamani | G06F 17/30867 707/694 |
| 2003/0023677 | A1* | 1/2003 | Morison Zuill | G06Q 10/10 709/203 |
| 2004/0064710 | A1* | 4/2004 | Vainstein | G06F 21/6209 713/189 |
| 2004/0085354 | A1* | 5/2004 | Massand | G06F 17/2229 715/751 |
| 2009/0112868 | A1* | 4/2009 | Rajamani | G06F 17/30867 |
| 2009/0299802 | A1* | 12/2009 | Brennan | G06Q 10/06 705/7.36 |
| 2012/0072723 | A1 | 3/2012 | Orsini et al. | |
| 2013/0185252 | A1* | 7/2013 | Palmucci | G06F 17/2288 707/608 |
| 2013/0212151 | A1* | 8/2013 | Herbach | H04L 67/42 709/203 |
| 2013/0254536 | A1 | 9/2013 | Glover | |
| 2013/0318589 | A1 | 11/2013 | Ford et al. | |
| 2014/0164776 | A1* | 6/2014 | Hook | H04L 9/14 713/171 |
| 2015/0135300 | A1* | 5/2015 | Ford | H04L 67/1097 726/11 |

OTHER PUBLICATIONS

"Intralinks VIA—Enterprise file sharing and collaboration," Intralinks website, http://www.intralinks.com/via/, May 3, 2013, 4 pages.
United States Patent and Trademark Office, Non-Final Office Action Issued in U.S. Appl. No. 14/316,777, dated Jul. 29, 2016, 18 pages.
United States Patent and Trademark Office, Notice of Allowance Issued in U.S. Appl. No. 14/316,777, dated Nov. 16, 2016, 9 pages.

* cited by examiner

JOINT OWNERSHIP OF PROTECTED INFORMATION

CROSS REFERENCE TO RELATED APPLICATIONS

This application is a continuation of U.S. Ser. No. 14/316,777, filed Jun. 26, 2014, the entirety of which is hereby incorporated herein by reference for all purposes.

TECHNICAL FIELD

This description relates generally to management of a collaborative document that is owned by two owners from different organizations.

BACKGROUND

Both individuals and companies often need to share sensitive information for collaboration, such as reviewing documents by multiple parties, journaling confidential audio, video or text based conversations. Sometimes multiple parties create and author protected information together (e.g. meetings recording) such that each party would like the ability to control the access to the content based on the trust between them, so if one party mistrusts the others, that party can ensure that their protected information is no longer accessible to the other parties.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides a system and method for managing a collaborative document that is owned by two different users who belong to different organizations. The users first create a document that will be owned by both users. Both users are also granted full ownership rights in the document. The users then contribute to the document by providing information that may be confidential to their organization. Due to the information being shared the users want to ensure that they can cut off access to this information if and when the relationship between the users or organizations sours. The access to the document is controlled by both users. They may add additional users to the access of the document who may be given access privileges to the document or may be given full ownership privileges. When one of the users with full ownership privileges decides to end the cooperation with the other users, that user simply revokes access to the document to the other user. As a result of the revocation all users are no longer able to see or access the entire document. In this way the confidential information of all parties is protected.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
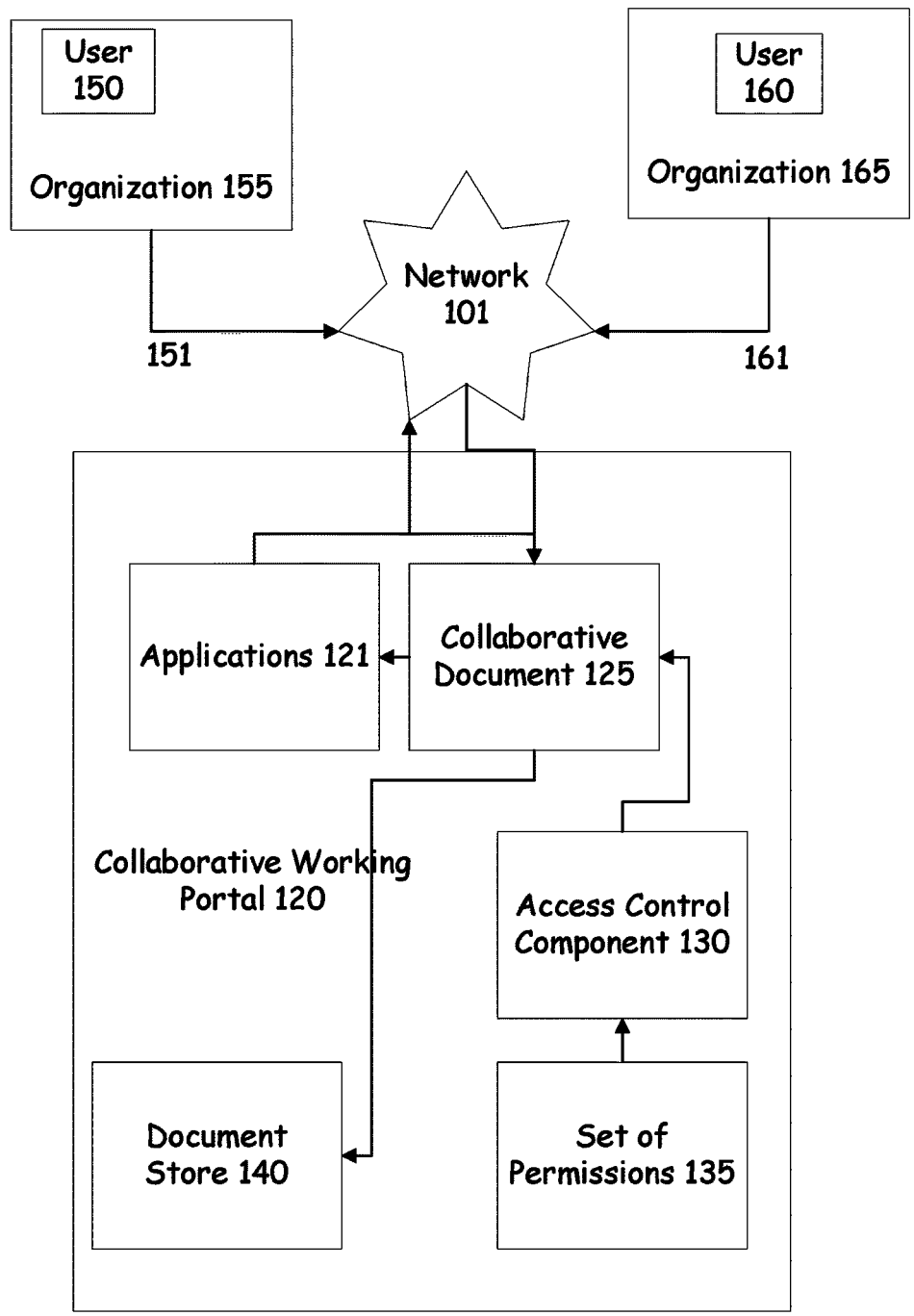
FIG. 1 is a block diagram illustrating a collaborative working environment where collaborative documents can be created by individuals or organizations that contain confidential or proprietary information from one or more of the organizations according to one illustrative embodiment.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. This is distinct from computer storage media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media, but not computer readable storage medium.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

With the advent of online collaborative working environments and virtual data rooms such as Office365 and Google Docs the ability to work with other people around the world has dramatically increased. The ease and efficiency in which individuals can collaborate in real time has further enabled the likelihood that individuals from different organizations will have a chance to work together in a collaborative environment. These individuals from different organizations can often be working in such a manner as to where they will be share confidential or other proprietary information during the creation of a collaborative document. Some situations where this can often come up in are joint development of products, contract negotiations between parties, mergers and acquisitions, joint legal defenses, product purchases, consulting agreements, etc. Typically the organizations have put in place agreements that define how each other will treat the other's confidential or proprietary information. These agreements often state what the other party can or cannot do with the information that is shared from one party to the other. Many times these agreements also state what the parties must do with the other party's the information once the agreement is terminated, expires or the parties decide not to continue working together. One of the biggest concerns in these types of agreements or situations is ensuring that the other party actually complies with the terms of the agreement.

The following provides a simplified scenario in which the present discussion is based around. Contoso, Fabricam and Adatum companies would like to establish a partnership for a marketing campaign. They set an online meeting, expose and share sensitive sales information. They record the meeting using a software product and save it to a protected video file with a joint-ownership mode. After several days while they could access the protected video file in furtherance of the campaign, Contoso discovers that Fabricam and Adatum had plotted to cause them severe losses. Contoso decides to break the partnership and revokes the access for the video file from all three parties. As a result neither Contoso, nor Fabricam nor Adatum is able access the protected video file. This approach protects all of the companies' confidential and proprietary information that has been shared.

FIG. 1 is a block diagram illustrating a collaborative working environment where collaborative documents can be created by individuals or organizations that contain confidential or proprietary information from one or more of the organizations. The collaborative document system 100 of FIG. 1, according to one illustrative embodiment, includes a collaborative working portal 120, an access control component 130, a document store 140, a user 150 and a user 160.

User 150 is, for example, a user who is working on a collaborative document with user 160 from a different organization. User 150 may interact with the collaborative working portal through a network 101, such as the internet or other network, and a network connection such as network connection 151. Network connection 151 can be any type of network connection that is available to the user 150 to connect with the collaborative working portal. User 150 is a member of organization 155 that is providing confidential or proprietary information to the collaborative document 125. Similarly, user 160 is, for example, a user who is working on a collaborative document with user 150 from the different organization 156. User 160 may interact with the collaborative working portal through a network connection such as network connection 161. Network connection 161 can be any type of network connection that is available to the user 160 to connect with the collaborative working portal. User 160 is a member of organization 165 that is providing confidential or proprietary information of organization 165 to the collaborative document.

The user 150 interacts with the collaborative working portal 120 through the network connection 151 to access the collaborative document 125. In the same way user 160 can interact with the collaborative working portal 120 though the network connection 161 to access the collaborative document 125.

In some embodiments the user 150 is able to work on the collaborative document 125 in real time with the user 160. The users 150 and 160 are in some embodiments able to work on the collaborative document at different times as well. In yet other embodiments only one of the users 150 or 160 is able to work on the document at once. This scenario occurs typically in collaborative working portals where the document is checked out by one user 150, 160 and as a result is locked from editing by the other user. In some scenarios the user who is locked out from editing the document may still be able to view the document. In some of these scenarios the user who is locked out of the document may be able to see the changes that are made to the document in real-time. In some scenarios the user who is locked out can make changes to the document, but these changes are not reflected in the version of the document that is displayed to the user who is currently able to edit the document. The changes that the locked out user makes to the document in this scenario can be incorporated into the original document once the editing user checks the document back into the system and allows for others to edit the document 125. To avoid unnecessary changes or conflicting changes to the document, the user may be presented with the changes in a manner that the locked out user can see how their changes affect the edited document. These changes can be presented to the user in this scenario through the use of redline format. The locked out user can then determine which of the changes they wish to incorporate into the document 125.

Organizations 155 and 165 are different organizations that are working together with each other on the creation of a collaborative document. These organizations 155, 165 are in one embodiment organizations that typically compete with one another in various arenas. However, for some reason these organizations have decided to collaborate on the creation of at least one document that will include or may include confidential or proprietary information related to at least one of the organizations 155, 165. While FIG. 1 illustrates only two users and two organizations the present disclosure can be implemented with any number of different organizations as well as any number of users from within the organizations. Also, while the present discussion centers around the organizations being different organizations, the organizations 155 and 165 can be the same organization where information is siloed or not typically shared among divisions of the same organization. This could occur in situations such as the military, the government or law firms, where different parts have access to different knowledge and may not need to share out this knowledge with each other on a regular basis.

The collaborative working portal 120 is in one embodiment a cloud based service that permits users to access documents, such as collaborative document 125, to create and edit the documents, such as Microsoft's Office365 of Google's Google Docs. However, the collaborative working portal 120 can be any portal that permits users to remotely access documents and edit them in a collaborative manner. This can also include systems that are not cloud based where users check out documents and check the document back in when they are done making the edits. In one exemplary scenario, the collaborative document 125 is hosted by one of the organizations 155, 165 and access is granted to the other organization through a Virtual Private Network (VPN) or other means.

The collaborative working portal 120 typically hosts a number of different applications 121 or application interfaces that permit the users to access the collaborative documents 125 and edit the document. In some embodiments the applications permit both users 150 and 160 to edit the documents at the same time and see the changes each author is making in real time. These applications 121 can sometimes even allow one user see where in the document the other user currently has a cursor or is otherwise viewing. In this way the collaborative working portal 120 allows the users 150 and 160 to effectively collaborate with each other. Applications 121 can be any type of application. For example, applications 121 can include a word processing application, a spreadsheet application, a database application, a presentation application, an email application, a drawing application, an instant messaging application, a video conference application, a recording application, etc.

Collaborative document 125 is any document that users can collaborate on in the creation of the document. Collaborative document 125 can include a word processing document, a spreadsheet document, a presentation document, an email, a drawing document, a website, an instant message portal, a video recording, or any other type of document or creative content that can be collaborated on. Further, the collaborative document 125 can be a combination of multiple different documents or different types of documents. As the collaborative documents 125 include confidential or proprietary information from at least one of the organizations 155 or 165 additional access controls are placed on the document 125 to help ensure that the information contained in the collaborative document is not shared beyond the intended community of users. However, because the collaborative document 125 is a joint document between two different organizations the management of the access control and the effects of changing the access control are significantly different from that of normal access controlled documents. This access control can even extend to capture histories of conversations where the document only exists on one user's machine, such as a chat history.

Access control component 130 is a component of the system 100 that controls access to the collaborative document 125. The access control component 130 takes each document that is identified as a joint ownership document and adds a set of permissions 135 to the document. This set of permissions 135 determines who may access the document and what these individuals can do with the document. Some of the permissions can include permission to edit the document, view the document, print the document, share the document or download the document. However, other types of permissions may be added to a document. These permissions can be expressed through an access control list or other approach. The access control component 130 also identifies what organization each user belongs to. In this way the access control component 130 can associate content with individuals and organizations. The access control component 130 can be implemented using any system for regulating and controlling access to resources that permits users to be given various levels of access, privileges and control to resources or content, such as Active Directory, Microsoft RMS, WatchDox, and Intralinks.

The access control component 130 may receive instructions from one or both of users 155 or 165 regarding the management of the joint collaborative document 125. These instructions may be the addition of additional users who may access the document 125, may be changes in the privileges of various uses of the documents 125, it could be the revocation of access to the document for certain users currently having access to the document, or any other type of change in the permissions of the users. In some embodiments the users 155 and 165 are administrators for their respective organizations who have the ability to manage the users in their respective organizations access to the joint collaborative document. However, in some scenarios other users may be designated administrators such that access can be controlled even in one of the original users somehow becomes unavailable. This allows each organization to manage the document internally according to their own policies without concern for the policies of the other organization.

The access control component 130 performs an important function on the collaborative document 125 when one or more of the organizations 155, 165 decides to remove access to the document to an individual or the other organization. As the document 125 contains confidential information related to both organizations 155, 165 the management of the removal of permission to access the collaborative document 125 is more troublesome. In traditional access management when a person has their permission changed so they can no longer access the document only that person is impacted by the change in the access policy. In the present system when a user or organization is denied access a number of different processes can occur depending on the set up of the permissions and the joint collaborative document.

If the revocation of the access is made by one organization 155 as against the other organization 165 one of several possible actions or responses can occur. First when the revocation occurs the revocation can cause all members of both organizations to no longer have access to the joint collaborative document. In this way the confidential or proprietary information contained in the document can be fully protected. This can occur when it is difficult or impossible to determine which party contributed the information to the document 125 or based on the initial settings. The revocation by the one organization indicates that the work being done is no longer going forward and the access to both of their confidential information by the other party is no longer authorized. In an alternative approach, the application 121 or the access control component 130 tracks the changes and/or contributions made by each of the organizations and/or users and associates that information with that user. These changes in the document are then tagged with metadata or other mechanisms as being the contributions from that particular organization or user who made the specific changes. When the revocation occurs, the access control component 130 modifies the permissions on the document such that changes and/or contributions made by the other party (i.e. the party that had permissions revoked) are redacted from the document when the revoking party views the document. In this way the revoking party still has access to the content that they provided without having access to the portions provided by the other party. Conversely, the other party will have access to the document as well, but with the revoking party's contributions redacted. In some embodiments each party may have to identify positively the portions of the document that contains that party's confidential or proprietary information. In other embodiments one party may still see their contribution while the other party cannot see the contents of the document. Information related to the individual who changed the permissions to the document may be tracked and stored for later review.

When the permissions are changed by one user or organization the access control component 130 can send a message to the user or organization that had its privileges revoked. In this way the other organization is informed of the revocation and can take necessary actions as well. Even once the revocation of privileges has occurred the party that had their privileges revoked still has access to the management of the document 125 even if they cannot access the contents of the document 125. In this way the revoked party can still control who has access to the document. The revoked party can in turn revoke the privileges of any other party who had or has access to the document. This approach ensures that in scenarios where access can regranted following revocation the revoking party cannot simply reinstate privileges without the other party agreeing on this as well.

Documents 125 that have had access privileges revoked can continue to exist and remain on the collaborative working portal 120. The documents may continue to reside on the document store 140 and the organizations may continue to see the documents as being there, but that the permissions have been revoked. In some embodiments, either party may go back into the document and change the permissions to the document 125. For example, the organizations may have had a falling out and now wish to reinstate the relationship with each other. Either party can go back into the permissions and change the permissions that they control to allow the other party access to the document 125. The access control component 130 may send a message to the other organization indicating that permission has been granted and verifying if the other organization wishes to allow access as well. If both parties agree to allowing access again the document will become available to both parties again.

The document store 140 is a storage system or location that is part of the collaborative working portal 120. The document store 140 stores all or at least a portions of the documents that have been created on the collaborative working portal 120 by all of the users of the system 100. Documents that are stored in the document store 140 are identified with the respective users who can access or create the documents. In some embodiments the documents in the document store 140 are encoded or encrypted with a content key. This content key is composed of a key that is a combination of the associated tenant keys for each of the organizations. In this way the document store 140 can help ensure that documents are only accessible by the correct or intended users. In some configurations the document store will allow users to see documents that they previously had access to but no longer have access to. When presenting the documents 125 to the user 150, 160 in a user interface the document store 140 can illustrate the non-accessible documents in a manner that differentiates the document from documents that the user has access to, such as for example, using a different shading for documents with which the user has access to as against those they do not have access to, using a different icon to show the different levels of access to the documents, etc. As the documents 125 are typically encrypted the document store 140 may only allow access to the document 125 if a revoking owners list for the document is empty. The user may see the document but the key to unlock the document may only be returned by the access control component 130 if the revoking owners list for the document is empty.

In some configurations the document store 140 may be instructed by the access control component 130 to allow a collaborative document 125 to be downloaded or accessed offline, that is accessible without having an active connection to the collaborative working portal 120. In these instances the document store 140 can place a timer on the collaborative document such that when the document is downloaded access will only be granted to the document for a period of time prior to the document being locked down. This period of time can be adjusted by the users and may range from a few minutes to a few hours or even a couple of days. The user who downloads the document 125 will have to reconnect to the collaborative working portal prior to the timeout to continue to have access to the document. In this way the users 150 and 160 can access the documents offline, yet the joint ownership of the document and the enforcement of the access can be controlled. If the user fails to reconnect into the portal 120 within the time period the document 125 will be locked down from access. In some embodiments the document may be deleted or otherwise "self-destruct" on the user's local device. This information may be stored in the set of permissions 135.

Figure 2:
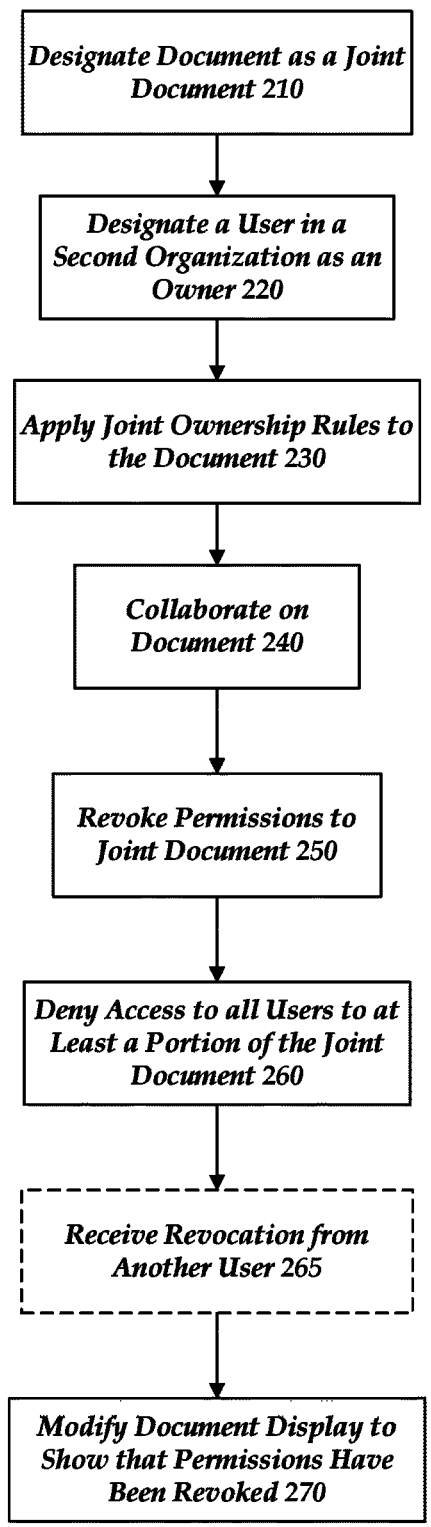
FIG. 2 is flow diagram illustrating a process for implementing the joint collaborative document system according to one illustrative embodiment.

FIG. 2 is flow diagram illustrating a process for implementing the joint collaborative document system 100 of FIG. 1. The process for creating a joint collaborative document begins when either user 155 or 165 creates the document and identifies the document as a joint document. This is illustrated at step 210. At this step the user may create the document 125 through one of the applications on the collaborative working portal 120. If done this way the user may identify the document as a joint document by indicating in the properties that the document is a joint document. When indicated as a joint document the access control component 130 may tag the document as a joint document. The access control component 130 may then prompt the user through the application to provide information as to how the document 125 shall be handled as a joint document. This may include prompting the user to provide a designation as to what happens when privileges are revoked to the document, such as locking all parties out of the document, or locking out only a portion of the document. If only a portion of the document is to be locked out upon revocation of the privileges the user may be presented with options on how the document is to be partially locked out. The user may select that contributions from the other party will be redacted from the document, or the user may activate a feature whereby each user can indicate what portions of the document are confidential material that is to be redacted out of the document. Once user 150 completes the process their selections are added to the properties for the document 125.

Once the document has been created and designated as a joint collaborative document 125, the creating user designates a user in the corresponding organization as an administrator or owner for the document. This is illustrated at step 220. The user 160 in the other organization 165 can receive a notice that a joint collaborative document has been created and that the user 160 has been designated as an administrator for organization 165 on the joint collaborative document 125. This notice can be for example via the portal 120 or through an email message to the user 160. The user 160 then is able to access the document 125 and is first presented with an interface similar to the interface that was presented to user 150 at step 210 during the creation of the rules for the joint collaborative document 125. User 160 then proceeds to determine how they wish the confidential information to be handled. The user's 160 selections are then added to the document's properties. In some embodiments the user 160 can access the document 125 immediately upon receiving notice of the creation of the document 125. In this scenario the user can perform step 220 at a later time. It should also be noted that users 150 and 160 can return to the permissions portions at any time to modify the permissions to the document 125 to change how the confidential information is handled or to add or delete additional users or organizations to the document.

Steps 210 and 220 can be repeated as many times as is necessary to add the appropriate users and organizations that will be collaborating on the document 125. In some embodiments the original user 150 who created the document controls who can be added as additional users and organizations that will have access to the documents. In other embodiments any of the authorized users 150 and 160 can add additional users. In some embodiments the addition of users beyond the initial two organizations requires the agreement of all of the organizations that currently have access to the document.

Once the permissions for the document have been entered by the users 150 and/or 160 the access control component 130 proceeds to apply the selected rules and permissions to the document. This is illustrated at step 230. The access control component 130 can compare the permissions and rules selected by each user and determine which rule to apply to the document. The access control component 130 looks at each of the rules and determines if the rules are the same or if they are different. If the rules are the same from both users then the access control component selects that rule as the rule that applies to the document 125. If the rules are not the same the access control component 130 determines which rule is the most restrictive rule. For example, if user 150 wished to use the redaction rule by redacting out the portion of the document 125 that was designated as confidential and user 160 wanted to revoke access completely, the access control component would determine that user 160's rule was more restrictive and therefore that rule would be applied to the document over the rule desired by user 150. Alternatively, the access control component 130 can apply user 150's rule to user 160 and vice versa. This would allow upon revocation that user 150 could not see any of the documents but user 160 could see the part of the document that was not redacted by user 150.

Once the rules and permissions for the document 125 have been established at step 230 the users 150 and 160 are able to collaborate on the document 125 by sharing the information that they desire through the application on the collaborative work portal 120. This is illustrated at step 240. The users 150 and 160 edit and/or create content in the document as they would in any other normal document that they use. Depending on the various rules that are applied to the document the users 150 and 160 may have the option of designating portions of the document as being confidential. In this approach the user would simply highlight or otherwise indicate the portions of the document 125 that they deem to be confidential and that indication would be stored with the document 125. If the other user were to edit in this space with information that is their own and designate it confidential as well to their organization the access control component 130 could identify it as being both confidential to both parties. In some embodiments if information that is labeled confidential by one user 150 is re-entered by the other user 160 elsewhere in the document the access control component 130 could identify this information as belonging to user 150 and label it as confidential to user 150. This could be achieved by, for example, using word matching or applying machine learning on the natural language to identify that the same concept has been restated. In this way the ability to circumvent some of the features can be minimized. In some embodiments the users 150 and 160 do not need to designate the information as confidential, the access control component 130 tracks the input of each user in the application and automatically labels it as confidential. The revised version of the document is saved to the document storage 140 on a periodic basis either automatically by the corresponding application or on the command of one of the users 150, 160. Stored with the document 125 is the associated metadata that describes how the document is to be protected and the rights associated with the document.

The users 150 and 160 continue at step 240 until such time as one of the users 150 or 160 or one of the organizations 155 or 165 decides that the collaboration with the other organization or users is to be terminated. At this point one of the users who has the authority to change the permissions and is associated with the organization that desires to terminate the joint collaboration access a control panel or other interface associated with the permissions and access control of the document 125. The user then indicates through the interface that the joint ownership status of the document 125 has been terminated. This is illustrated at step 250. It should be noted that any method or approach for indicating that the access to the document is to be changed may be used. In situations where there are more than two organizations collaborating (or two individuals) the user terminating the collaboration may terminate the collaboration with any number of the organizations or individuals. In some scenarios it is possible to track and see which individual revoked access to the document. This can be useful in situations where an employee is acting in a manner that is not consistent with the organization's interests or merely as an audit trail to know how the document has been handled. This can be expressed through a revoking owners list.

Once the revocation has been input the access control component 130 begins the process of changing the permissions to the document 125 to deny access by the other organization to at least a portion of the document 125 according to the received instructions. This is illustrated at step 260. Depending on the original set up of the joint collaboration the access control component 130 will modify the permissions to the document differently. In one embodiment, the revocation of the access to the document will cause both users 150 and 160 and organizations 155 and 165 to lose access to the entire document. In another embodiment each user will lose access to the contributions of the other users. (e.g. user 150 will not see contributions from user 160 and vice versa). In yet another embodiment each user 150, 160 will only loose access to the portions of the document 125 that were identified as confidential by the other user. In some embodiments where the users wished to have different restrictions placed on the document the access control component 130 will apply the desired restrictions and actions on the document such that the other user can only access the portions of the document were defined as being accessible upon revocation of access.

In some embodiments the act of revocation causes a message or other indication to be sent to the non-revoking organization. For example, if user 150 revoked access to organization 165, then user 160 would receive a notice that access has been revoked to the document. User 165 would then be given the opportunity to revoke access as well. This is illustrated at step 265. In this way both parties can revoke the access and prevent the regaining of access without the other parties knowledge or consent. This also ensures that the confidential or proprietary information remains protected.

Upon the revocation of the access to the document 125, the document 125 disappears from the list of available documents. This is illustrated at step 270. Document 125 can disappear any number of ways. In one embodiment the document is not visible in a list of documents that the user 150, 160 has access to. In another embodiment the revoked document is displayed in a greyed out manner to indicate to the user that access to the document has been revoked. In yet another embodiment the document 125 may be moved to another location with other documents that the user 150 or 160 no longer has access to. Of course other indications of the lack of access can be used as well.

In some embodiments the revocation of the access to the document is irrevocable. In this scenario, once the access has been terminated there is no ability to recover the document. However, in other embodiments the revocation is reversible. In these instances, the user wishing to regrant access to the document 125 identifies the document 125 and access the permissions list and regrants the access to the document. The regranting process is similar to the above only that the individuals or organizations that previously had access may be listed on the display as having had access revoked. However, a more detailed description of the regranting process is illustrated below with respect to FIG. 3.

Figure 3:
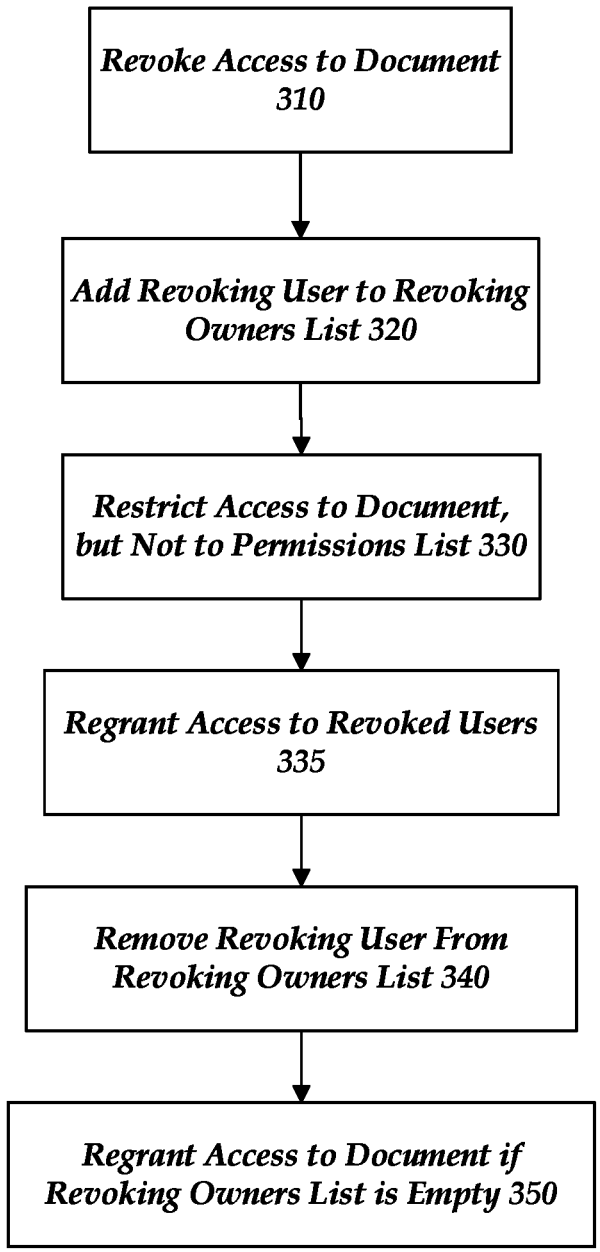
FIG. 3 is a flow diagram illustrating the process for regranting access to the collaborative document according to one illustrative embodiment.

FIG. 3 is a flow diagram illustrating the process for regranting access to the collaborative document 125 according to one illustrative embodiment. The process begins when one of the users 150 or 160 revokes access to the collaborative document. The process of revoking the access to the document can occur as discussed above with respect to FIG. 1 and FIG. 2. This is illustrated at step 310.

Next, the user who revoked the access to the document 125 is added to the revoking owners list. This is illustrated at step 320. The revoking owners list is a list of each of the users who has revoked access to the document. Depending on the configuration of the access control list the revocation levels may also be noted in the revoked owners list. The revoking owners list also may include an association to the organization associated with the revoking user. Access to the collaborative document 125 is then restricted by the system 100 such that all of the users are not able to see or access at least a portion of the collaborative document 125. This is illustrated at step 330.

At some time later one of the revoking users decides that they wish to continue working with the other users on the collaborative document. The revoking user then provides instructions to the access control component 130 that they wish to regrant access to the revoked user. This is illustrated at step 335. Next the user regranting access is removed from the revoking owners list. This process does not remove other users from the revoking owners list. However, in some embodiments an administrator may be able to remove from the revoking owners list all users associated with that administrator's organization that appear in the revoking owners list. This is illustrated at step 340

The access control component 130 then determines if the revoking owners list is empty. If the revoking owners list is empty then unrestricted access to the document 125 is regranted to all of the users. This is illustrated at step 350. If the revoking owners list is not empty the access control component 130 does not regrant unrestricted access to the document 125. In some embodiments the access control component will notify the others users in the revoking owners list that one of the revoking owners has decided to regrant access to the document. These other users can then go in and remove their entries from the list as well if they desire to regrant access to the document. These users would simply repeat steps 340 and 350 to regrant access as well.

Figure 4:
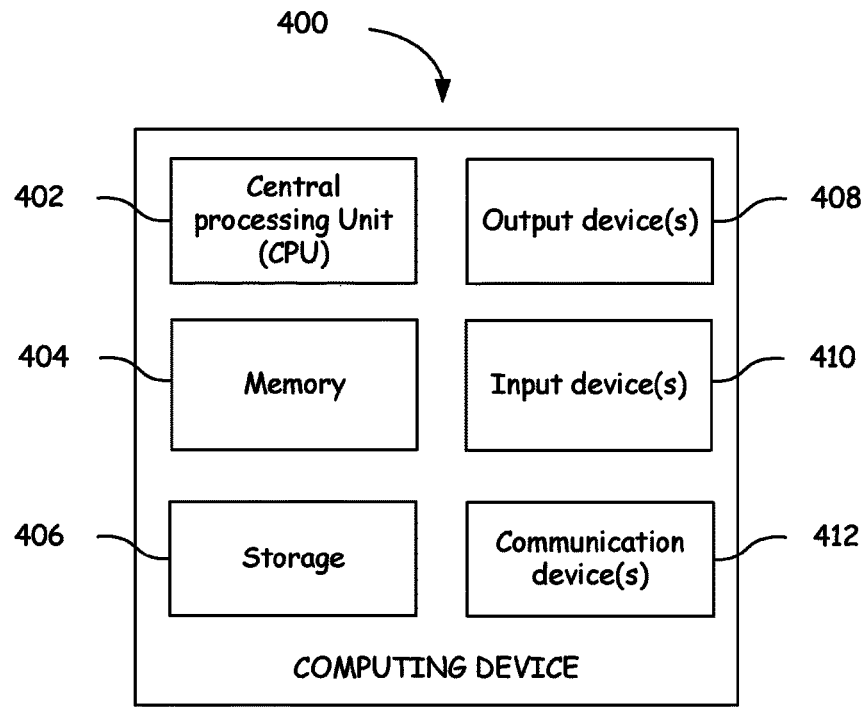
FIG. 4 illustrates a component diagram of a computing device according to one embodiment.

FIG. 4 illustrates a component diagram of a computing device according to one embodiment. The computing device 400 can be utilized to implement one or more computing devices, computer processes, or software modules described herein. In one example, the computing device 400 can be utilized to process calculations, execute instructions, receive and transmit digital signals. In another example, the computing device 400 can be utilized to process calculations, execute instructions, receive and transmit digital signals, receive and transmit search queries, and hypertext, compile computer code, as required by the system of the present embodiments. Further, computing device 400 can be a distributed computing device where components of computing device 400 are located on different computing devices that are connected to each other through network or other forms of connections. Additionally, computing device 400 can be a cloud based computing device.

The computing device 400 can be any general or special purpose computer now known or to become known capable of performing the steps and/or performing the functions described herein, either in software, hardware, firmware, or a combination thereof.

In its most basic configuration, computing device 400 typically includes at least one central processing unit (CPU) 402 and memory 404. Depending on the exact configuration and type of computing device, memory 404 may be volatile (such as RAM), non-volatile (such as ROM, flash memory, etc.) or some combination of the two. Additionally, computing device 400 may also have additional features/functionality. For example, computing device 400 may include multiple CPU's. The described methods may be executed in any manner by any processing unit in computing device 400. For example, the described process may be executed by both multiple CPU's in parallel.

Computing device 400 may also include additional storage (removable and/or non-removable) including, but not limited to, magnetic or optical disks or tape. Such additional storage is illustrated in FIG. 5 by storage 406. Computer storage media includes volatile and nonvolatile, removable and non-removable media implemented in any method or technology for storage of information such as computer readable instructions, data structures, program modules or other data. Memory 404 and storage 406 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 400. Any such computer storage media may be part of computing device 400.

Computing device 400 may also contain communications device(s) 412 that allow the device to communicate with other devices. Communications device(s) 412 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both computer storage media and communication media. The described methods may be encoded in any computer-readable media in any form, such as data, computer-executable instructions, and the like.

Computing device 400 may also have input device(s) 410 such as keyboard, mouse, pen, voice input device, touch input device, etc. Output device(s) 408 such as a display, speakers, printer, etc. may also be included. All these devices are well known in the art and need not be discussed at length.

Those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. Enacted on a computer network, a method for creating and managing joint ownership of collaborative electronic data, the method comprising:
   creating the collaborative electronic data on a collaborative network portal of the computer network;
   indicating on the network that the collaborative electronic data is owned by a first user from a first organization and a second user from a different, second organization;
   determining via the network that the second user has revoked network access to the collaborative electronic data by the first user;
   adding the second user to a revoking owners list stored on the network;
   blocking network access to at least a portion of contents of the collaborative electronic data by the first user and by the second user;
   receiving via the network instructions from the second user to restore network access to the collaborative electronic data by the first user;
   removing the second user from the revoking owners list; and
   allowing network access to the collaborative electronic data by the first and second users when the revoking owners list is empty.

2. The method of claim 1, where the collaborative electronic data includes one or more of a word processing document, a spreadsheet document, a presentation document, an email, a drawing document, a website, a message portal, and a video recording.

3. The method of claim 1, wherein indicating on the network that the collaborative electronic data is owned by the first user and the second user further comprises:
   designating a first administrator for the collaborative electronic data in the first organization and a second administrator for the collaborative electronic data in the second organization.

4. The method of claim 3, wherein the first administrator and the second administrator can revoke access to the collaborative electronic data from any user currently having access to the collaborative electronic data.

5. The method of claim 1, wherein the portion of the collaborative electronic data includes all of the collaborative electronic data.

6. The method of claim 1, further comprising:
   displaying the collaborative electronic data in a redacted format following revocation of access by the first and second users, wherein the redacted format redacts proprietary information of the first user from the collaborative electronic data when the data is displayed to the second user and redacts proprietary information of the second user from the collaborative electronic data when the data is displayed to the first user.

7. A computer system operatively coupled to a computer network, the computer system comprising:
   A processor implementing a collaborative network portal allow a first user associated with a first organization and a second user associated with a different, second organization to access collaborative electronic data; and
   an access control component configured to control access to the collaborative electronic data based on a set of permissions regulating access to the collaborative electronic data by the first and second users, wherein the access control component is configured to:
   identify the collaborative electronic data in the collaborative network portal, the collaborative electronic data being jointly owned by the first and second users;
   determine via the computer network that the second user has revoked network access to the collaborative electronic data by the first user;
   add the second user to a revoking owners list stored on the computer network;
   block network access to at least a portion of contents of the collaborative electronic data by the first user and by the second user;
   receive, via the computer network, instructions from the second user to restore network access to the collaborative electronic data by the first user;

remove the second user from the revoking owners list; and allow network access to the collaborative electronic data to the first and second users when the revoking owners list is empty.

8. The computer system of claim 7, where the collaborative electronic data includes one or more of a word processing document, a spreadsheet document, a presentation document, an email, a drawing document, a website, a message portal, and a video recording.

9. The computer system of claim 7, wherein the access control component includes at least one application configured to permit the first user and the second user to modify the collaborative electronic data when the revoking owners list is empty based on a permission in the set of permissions.

10. The computer system of claim 7, wherein the set of permissions may be modified by the first user and the second user.

11. The computer system of claim 7, wherein revoking the first and second user's access to the collaborative electronic data including redacting a portion of the collaborative electronic data.

12. The computer system of claim 7, wherein the access control component is further configured to notify the first user of changes to the set of permissions made by the second user and notify the second user of changes to the set of permissions made by the first user.

13. The computer system of claim 7, wherein the set of permissions includes:

a first permission that permits the first user or the second user to download the collaborative electronic data when the revoking owners list is empty; and a second permission that requires access to the collaborative electronic data to only be available for a predetermined period of time when the revoking owners list is empty.

14. A hardware computer-readable storage medium having computer-executable instructions that, when executed by a computer on a network cause the computer to:

identify a collaborative electronic data in a collaborative network portal, the collaborative electronic data being jointly owned by a first user from a first organization and a second user from a different, second organization;

determine via the network that the second user has revoked network access to the collaborative electronic data by the first user;

add the second user to a revoking owners list stored on the network;

block network access to at least a portion of contents of the collaborative electronic data by the first user and by the second user;

receive via the network instructions from the second user to restore network access to the collaborative electronic data by the first user;

remove the second user from the revoking owners list; and allow network access to the collaborative electronic data to the first and second users when the revoking owners list is empty.

15. The computer readable storage medium of claim 14, where the collaborative electronic data includes one or more of a word processing document, a spreadsheet document, a presentation document, an email, a drawing document, a web site, a message portal, and a video recording.

* * * * *